United States Patent [19]

Tveit et al.

[11] Patent Number: 5,035,457
[45] Date of Patent: Jul. 30, 1991

[54] SIMPLE TOOLING EXCHANGE

[75] Inventors: Gary L. Tveit, Churchville; Edward L. Nageldinger, Stanley, both of N.Y.

[73] Assignee: Eastman Kodak Company, Rochester, N.Y.

[21] Appl. No.: 559,785

[22] Filed: Jul. 30, 1990

[51] Int. Cl.[5] .................. B66C 1/42; B25J 15/00; B25G 3/00
[52] U.S. Cl. .................. 294/86.004; 294/103.001; 901/31; 901/41; 901/49; 403/254; 403/353
[58] Field of Search .................. 294/86.4, 103.1, 90; 901/30, 31, 39, 41, 45, 49; 403/254, 353, 316; 248/223.1, 222.4

[56] References Cited

U.S. PATENT DOCUMENTS

| 440,094 | 11/1890 | Kennedy | 403/327 |
|---|---|---|---|
| 810,230 | 1/1906 | Swan | 403/327 |
| 2,489,864 | 11/1949 | Cravener | 294/119.001 X |
| 4,320,885 | 3/1982 | Kawazoe | 248/222.004 X |
| 4,349,946 | 9/1982 | McMurtry | 29/57 |
| 4,358,888 | 11/1982 | Zankl et al. | 29/568 |
| 4,499,650 | 2/1985 | Cannon et al. | 29/568 |
| 4,510,355 | 4/1985 | Atsumi et al. | 403/354 |
| 4,512,709 | 4/1985 | Hennekes et al. | 414/729 |
| 4,688,307 | 8/1987 | Schneider et al. | 29/568 |
| 4,826,230 | 5/1989 | Truchet | 294/90 X |
| 4,954,005 | 9/1990 | Knasel et al. | 901/49 X |

FOREIGN PATENT DOCUMENTS 0271485 9/1989 Fed. Rep. of Germany ........ 901/41

OTHER PUBLICATIONS

Article titled "Tool Exchange Is Basis For Generic Workcells" by I. Petronis, as reprinted from Robotics World, May 1987.
4 pages re "Quick Change EOAT Adapter" from catalog of Standard Products Division, Automation Tooling Systems Inc., Kitchener, Ont. (No date).

Primary Examiner—Johnny D. Cherry
Assistant Examiner—Cathleen G. Pringle
Attorney, Agent, or Firm—William C. Dixon, III

[57] ABSTRACT

A device for exchanging simple tools that do not need utility service is adapted to facilitate coupling one such tool to, and uncoupling it from, a movable robotic arm. The device comprises an attaching member attachable to the tool, a supporting member connected to the arm and having an open slot therein and a recessed upper surface adjacent to the slot, and a retaining member movably mounted to the arm above the supporting member and spring-biased toward the supporting member slot and upper surface. The attaching member, attached to the tool, is received by the open slot, supported by the recessed upper surface, and yieldably retained there by the spring-biased retaining member during use. The attaching member is then withdrawn from the slot, upper surface, and retaining member, and returned to a storage rack located nearby.

7 Claims, 1 Drawing Sheet

U.S. Patent    July 30, 1991    5,035,457
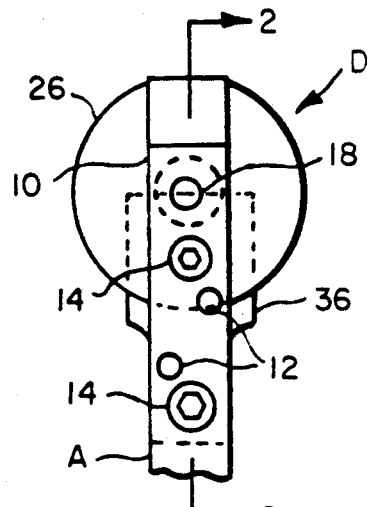
FIG. 1
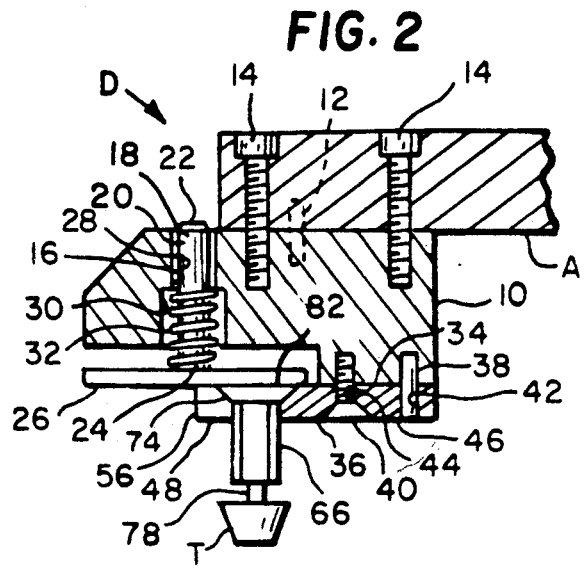
FIG. 2
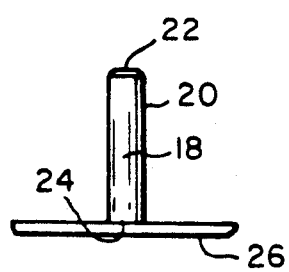
FIG. 3
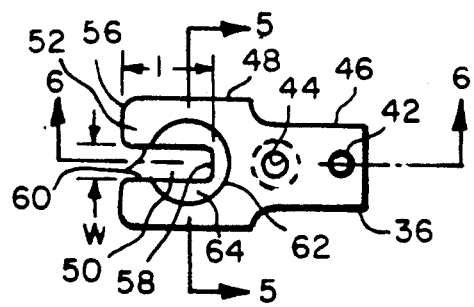
FIG. 4
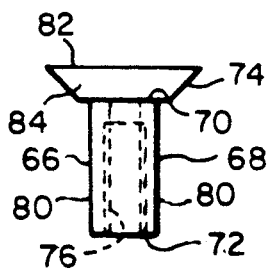
FIG. 7
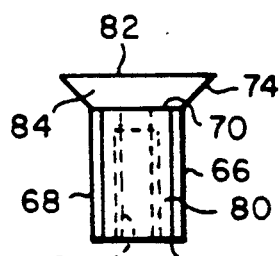
FIG. 9
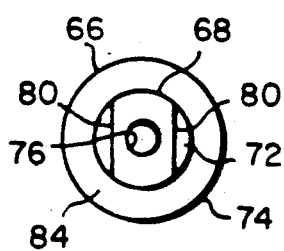
FIG. 8
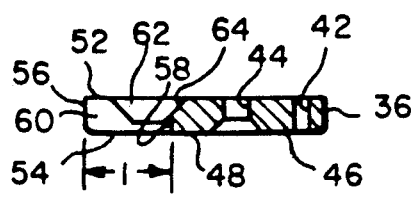
FIG. 5
FIG. 6

SIMPLE TOOLING EXCHANGE

BACKGROUND OF THE INVENTION

1. Field of the Invention

The present invention relates generally to tool exchanging, and particularly to a device for exchanging tools of a simple type not requiring a utility service for their intended use.

2. Description of the Prior Art

Various devices for changing, or exchanging, tools are well known in the prior art. Examples may be found in the following patents:

U.S. Pat. No. 4,349,946 (McMurtry)—Discloses a tool connecting device wherein a tool holder is yieldably held in engagement with supporting means on a tool pick-up member by a compression-spring-loaded plate on said member axially urging said holder against the supporting means.

U.S. Pat. No. 4,358,888 (Zankl et al.)—Discloses an automatic tool changer including a tool storage magazine having a plurality of tool grippers, each gripper including a resiliently biased spring element for releasably gripping a mating tool holder when engaged thereby, and for readily releasing said holder to effect an automatic tool change.

U.S. Pat. No. 4,512,709 (Hennekes et al.)—Discloses a robot tool-changer system wherein each tool holder has a common T-shaped base portion that is engageable with a mating robot adapter via a U-shaped slot therein to readily engage and disengage the two.

U.S. Pat. No. 4,688,307 (Schneider et al.)—Discloses a storage magazine adapted to hold a probe in position for pick-up by an automatic probe exchanger, the magazine including a probe-supporting plate with a key-hole-shaped opening at one edge thereof for receiving the probe and a cover that is movably associated with the plate and spring-biased into overlying relation with the opening, the probe having an elongate stem (narrower than the opening) with a beveled circular flange (wider than the opening but narrower than the cover) at its upper end, the stem being laterally movable into the opening with its flange disposed thereabove for support by an adjacent portion of the plate and to be covered by an overlying portion of the cover.

While prior-art devices such as those described above may have sufficed for their own particular purposes, it has been found that commercially available tooling exchanges, especially those available for use with robotic arms, typically have been designed to attach and detach tools that require electric and/or pneumatic utility service(s). Such tooling exchanges are unnecessarily complex, excessively heavy, and overly expensive for efficient use in robotic applications involving relatively simple tools that do not require a utility service, especially such tools that are hot-operating and therefore require some provision for compliance when in use. There has thus remained a need for a device that is specially adapted to exchange such simple tools in an efficient, cost-effective, reliable, and convenient manner.

An overall object of this invention, therefore, has been to provide a simple tooling exchange device that meets the foregoing need.

SUMMARY OF THE INVENTION

In accordance with that object, and as shown and described herein, the present invention finds particular utility in a device for exchanging tools of a simple type not requiring utility service. The device is adapted to facilitate coupling one such tool to, and uncoupling it from, a movable robotic arm. This device comprises the following combination of relatively simple component parts:

a tool attaching member which includes a body portion that is attachable at a lower end thereof to the tool and a head portion that is wider than the body portion and disposed at an upper end thereof;

a tool supporting member which is connected at one end thereof to the robotic arm; the supporting member has a slot therethrough which is open at an opposite end thereof and an upper surface thereon adjacent to the slot; the slot is wider than the attaching member body portion but narrower than its head portion, so as to receive the body portion therein with the head portion disposed thereabove for support by the adjacent upper surface;

a tool retaining member which is movably mounted to the arm and disposed above the supporting member; the retaining member includes a stem extending longitudinally between top and bottom ends thereof and a flange that extends transversely to the stem at its bottom end, in overlying relation to the supporting member slot and upper surface; the retaining member is movable longitudinally toward and away from the slot and upper surface; and means for resiliently biasing the retaining member toward the supporting member slot and upper surface, to thereby urge the retaining member flange into yieldable engagement with the attaching member head portion when the head portion is supported by the upper surface, and thus yieldably retain the attaching member on the supporting member.

This invention, and its objects and advantages, will become more apparent in the detailed description of a preferred embodiment thereof presented hereinbelow.

BRIEF DESCRIPTION OF THE DRAWINGS

In the detailed description of the preferred embodiment of this invention set forth below, reference is made to the accompanying drawings, wherein like reference characters denote like elements, and wherein:

FIG. 1 is a top-plan view of a simple tooling exchange device constructed according to the preferred embodiment of this invention, showing the device as mounted on part of an associated robotic arm member;

FIG. 2 is a cross-sectional view, taken along line 2—2 in FIG. 1, illustrating details of the device there shown;

FIG. 3 is a side-elevation view of a tool-retaining component of the device depicted in FIGS. 1 and 2;

FIG. 4 is a top-plan view of a tool-supporting component of the device depicted in FIGS. 1 and 2;

FIGS. 5 and 6 are cross-sectional views, taken respectively along lines 5—5 and 6—6 in FIG. 4, illustrating details of the tool-supporting component there shown; and FIGS. 7, 8, and 9 are front-elevation, bottom-plan, and side-elevation views, respectively, of a tool-attaching component of the device depicted in FIGS. 1 and 2.

DESCRIPTION OF THE PREFERRED EMBODIMENT

Because certain parts of tooling exchanges are well known, the following description is directed in particular to those elements forming, cooperating directly with, or relating especially to, this invention. Elements not specifically shown or described herein are selectable from those known in the pertinent art.

FIGS. 1 and 2 illustrate a simple tooling exchange device D that has been constructed in accordance with the preferred embodiment of this invention and mounted on a robotic arm member A. The device includes a mounting block 10 that is secured to the arm member by pairs of dowels 12 and machine screws 14.

Near the left end of block 10, as viewed in FIG. 2, is a vertical through-bore 16 provided to receive part of a movable tool retaining member 18, depicted in FIGS. 1-3. Retaining member 18 comprises a cylindrical stem 20, extending longitudinally between top and bottom ends 22 and 24 thereof, and a circular flange or disk 26 disposed in transverse concentric relation to the stem at its bottom end. As illustrated in FIG. 2, the upper end portion of through-bore 16 is fitted with an oil-impregnated plain bearing 28 dimensioned to slidably receive the retaining-member stem 20. The lower end portion of through-bore 16 is provided with a counterbore 30 dimensioned to receive a coil spring 32 therein around stem 20. When operatively positioned as shown, spring 32 is compressed between the upper end of counterbore 30 and the upper surface of disk 26, so as to bias the retaining member 18 downward.

Secured to a bottom surface 34 of block 10, near the right end thereof as viewed in FIG. 2, is a horizontally oriented tool supporting member 36, depicted in FIGS. 1, 2, and 4-6. Supporting member 36 is so secured by means of a dowel 38 and screw 40 passed through corresponding holes 42 and 44 in the right end portion 46 of member 36, as seen in FIG. 2. The opposite end portion 48 of member 36 is wider than end portion 46, as shown most clearly in FIG. 4. End portion 48 is provided with an open slot 50 and adjacent upper and lower surfaces 52 and 54. Slot 50 extends from the open end 56 of end portion 48, longitudinally inwardly toward end portion 46, to a closed end 58 of the slot. Slot 50 is cut vertically through member 36 so as to have a substantially uniform width w between its opposing sides 60 along its entire length 1. Upper surface 52 includes a recessed portion 62 adjacent to the slot closed end 58, portion 62 having a beveled surface 64 extending radially inward and downward from a surrounding portion of upper surface 52 toward lower surface 54 as shown in FIGS. 4-6.

Illustrated in FIGS. 2 and 7-9 is a tool attaching member 66 including a body portion 68, which extends longitudinally (vertically as depicted) between upper and lower ends 70 and 72 thereof, and a wider head portion 74 disposed at upper end 70. The body portion has a threaded hole 76 therein, extending upwardly from its lower end 72 toward the head portion, for attachably receiving a mating threaded stud 78 projecting from a tool T of the aforementioned simple type (shown schematically reduced in size). Tool attaching member 66 is configured and dimensioned to cooperate with supporting member 36. Toward that end, the slot 50 in member 36 is made wider than the attaching member body portion 68 but narrower than head portion 74, so as to receive the body portion therein with the head portion disposed thereabove for support by the adjacent upper surface 52. Also, the attaching member includes means for preventing rotation thereof relative to the supporting member when body portion 68 is received in slot 50. As can be seen most clearly in FIGS. 4, 5, and 7-9, such means comprises a pair of opposing flat vertical surfaces 80 on body portion 68 that closely confront the opposing sides 60 of slot 50 when the body portion is received therein, thereby preventing such relative rotation. Also, as best shown in FIGS. 7 and 9, the attaching member head portion 74 is provided with a substantially flat top surface 82 and a beveled perimetric surface 84 that extends radially inward and downward from top surface 82 toward body portion 68. The beveled perimetric surface 84 of head portion 74 and the beveled surface 64 of supporting member recessed portion 62 are so configured as to be mutually complemental and thus enable the head portion to be received by the recessed portion in mating relationship thereto, and thereby provide seated support of the head portion when the body portion is inserted fully into the slot as shown in FIG. 2.

It will be seen in FIG. 2 that the tool retaining member 18 is disposed above tool supporting member 36, and that the retaining member flange or disk 26 extends in overlying relation to, and is thus movable toward and away from, the supporting member slot 50 and adjacent upper surface 52. It also will be seen that spring 32, in biasing retaining member 18 downward as already mentioned, urges disk 26 toward slot 50 and surface 52, and thus into yieldable engagement with the attaching member head portion top surface 82 when head portion 74 is supported by the upper surface recessed portion 62, to thereby yieldably retain the attaching member on the supporting member. More particularly, it will be noted in FIG. 2 that the retaining member stem 20 is longitudinally (vertically as shown) aligned with the supporting member open end 56, in substantially perpendicular relation to supporting member upper surface 52, and that the retaining member flange or disk 26 extends radially outward from the stem bottom end 24 over an area surrounding open end 56, including slot 50 and adjacent upper surface 52, in substantially parallel relation to upper surface 52, so that spring 32 resiliently urges disk 26 toward said area around end 56 and thus into yieldable engagement with attaching member head portion 74 in upper surface recessed portion 62.

The simple tooling exchange embodiment described above has proven successful when employed to robotically pick up, hold during use, and put down a hot (400° F.) stamp adapted to mark manufacturing dates on plastic containers. In such use (referring to FIG. 2), the stamp or tool T is first attached to the attaching member 66 by screwing the tool stud 78 into the attaching member threaded hole 76. Next, the remainder of device D is brought into operative association with the attaching member by causing the attaching member top surface 82 to engage the lower surface of disk 26 and thereby move the retaining member 18 upwardly against the downward-biasing influence of spring 32. Then, with the attaching member flat surfaces 80 oriented in parallel alignment with the supporting member slot sides 60, the attaching member body portion 68 is inserted through open end 56 and fully into slot 50 to its closed end 58, whereupon the attaching member head portion 74 is seated in the supporting member recessed portion 62 and yieldably retained therein by the spring-biased retaining member disk 26. Retaining member 18 thus normally keeps head portion 74 centered in recessed portion 62 during use, but allows some compliance if the tool is bumped. The amount of compliance allowed can be varied by changing the clearances provided between mating parts. To put down the tool after use, the device D returns the tool attaching member to its storage rack (not shown) by causing the attaching member to be pushed out of engagement with the supporting and retaining members 36 and 18 and into receiving engagement with suitable holding structure on the rack.

It will now be appreciated that the aforementioned object of this invention has been fully met by the tool exchanging device herein described as the preferred embodiment illustrated. This device is sufficiently simple, light, and inexpensive for practical use in robotic applications involving simple tools that do not require a utility service, especially such tools that are hot-operating and therefore need some provision for compliance when in use. The described device is specially adapted to exchange such simple tools, and does so in an efficient, cost-effective, reliable, and convenient manner.

While the present invention has been described in detail with particular reference to its preferred embodiment illustrated herein, it should be understood that variations and modifications thereof can be effected within the spirit and scope of this invention.

We claim:

1. A device for exchanging tools of a simple type not requiring utility service, said device being adapted to facilitate coupling one such tool to, and uncoupling it from, a movable robotic arm, said device comprising:

a tool attaching member having a body portion attachable at a lower end thereof to the tool and a head portion wider than said body portion at an upper end thereof;

a tool supporting member connected at one end thereof to the arm, said supporting member having a slot therethrough open at an opposite end thereof and an upper surface adjacent to said slot, said slot being wider than said attaching member body portion but narrower than said head portion so as to receive said body portion therein with said head portion disposed thereabove for support by said adjacent upper surface;

a tool retaining member movably mounted to the arm above said supporting member, said retaining member including a stem extending longitudinally between top and bottom ends thereof and a flange extending transversely to said stem at said bottom end in overlying relation to said supporting member slot and upper surface, said retaining member being movable longitudinally toward and away from said slot and upper surface; and means for resiliently biasing said retaining member toward said supporting member slot and upper surface, to thereby urge said retaining member flange into yieldable engagement with said attaching member head portion when said head portion is supported by said upper surface, and thus yieldably retain said attaching member on said supporting member.

2. The device claimed in claim 1 wherein said tool attaching member includes means for preventing rotation thereof relative to said tool supporting member when said attaching member body portion is received in said supporting member slot.

3. The device claimed in claim 2 wherein said rotation preventing means includes opposing flat surfaces on said body portion that closely confront opposing sides of said slot.

4. The device claimed in claim 1 wherein said tool attaching member head portion includes a substantially flat top surface and a beveled perimetric surface extending from said top surface toward said attaching member body portion.

5. The device claimed in claim 4 wherein said tool supporting member slot extends inwardly from said supporting member opposite end to a closed end of said slot, and wherein said supporting member upper surface includes a recessed portion thereof adjacent to said slot closed end, said recessed portion having a beveled surface complemental to said perimetric surface of said attaching member head portion, so as to receive said head portion in mating relation thereto and thus provide seated support of said head portion when said attaching member body portion is fully received in said slot.

6. The device claimed in claim 1 wherein said tool retaining member stem is longitudinally aligned with said tool supporting member opposite end, in substantially perpendicular relation to said supporting member upper surface, and wherein said retaining member flange extends radially from said stem bottom end over an area surrounding said supporting member opposite end, including said slot and upper surface, in substantially parallel relation to said upper surface.

7. The device claimed in claim 6 wherein said biasing means includes a compression spring resiliently urging said retaining member flange toward said area surrounding said supporting member opposite end.

* * * * *